US012592953B2

(12) United States Patent
Zanouda et al.

(10) Patent No.: US 12,592,953 B2
(45) Date of Patent: Mar. 31, 2026

(54) METHODS AND APPARATUSES FOR DETECTING AND LOCALIZING FAULTS USING MACHINE LEARNING MODELS

(71) Applicant: Telefonaktiebolaget LM Ericsson (publ), Stockholm (SE)

(72) Inventors: Tahar Zanouda, Solna (SE); Saranya Govindaraj, Sollentuna (SE); Dominik Budyn, Dobczyce (PL); Martin Rydar, Yokohama (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 35 days.

(21) Appl. No.: 18/859,887

(22) PCT Filed: Aug. 1, 2022

(86) PCT No.: PCT/EP2022/071544
§ 371 (c)(1),
(2) Date: Oct. 24, 2024

(87) PCT Pub. No.: WO2024/027892
PCT Pub. Date: Feb. 8, 2024

(65) Prior Publication Data
US 2025/0294043 A1     Sep. 18, 2025

(51) Int. Cl.
H04L 9/40          (2022.01)
G06N 3/0442     (2023.01)
H04L 41/16       (2022.01)

(52) U.S. Cl.
CPC ....... H04L 63/1425 (2013.01); G06N 3/0442 (2023.01); H04L 41/16 (2013.01)

(58) Field of Classification Search
CPC .... H04L 63/1425; H04L 41/61; G06N 3/0442
(Continued)

(56) References Cited

U.S. PATENT DOCUMENTS 11,494,255 B2 * 11/2022 Wang ................... H04L 41/149
11,514,084 B2 * 11/2022 Savalle ............ G06F 16/24558
(Continued)

FOREIGN PATENT DOCUMENTS

WO       2021048311 A1     3/2021

OTHER PUBLICATIONS

International Search Report and Written Opinion of the International Searching Authority, PCT/EP2022/071544, mailed Mar. 1, 2023, 13 pages.
(Continued)

*Primary Examiner* — Samson B Lemma
(74) *Attorney, Agent, or Firm* — Sage Patent Group

(57)          ABSTRACT

A method of pre-processing data for use in training one or more machine learning, ML, models for use in detecting anomalies occurring during execution of one or more procedures at a plurality of network nodes in a network, includes: obtaining procedure level time series data relating to the execution of a first procedure at the plurality of network nodes; and deriving, from the procedure level time series data relating to the execution of the first procedure at the plurality of network nodes, one or more first feature time series of one or more respective first feature values, wherein the one or more first feature time series are for use in training a first ML model associated with the first procedure.

17 Claims, 15 Drawing Sheets

(58) Field of Classification Search
    USPC .......................................................... 726/22
    See application file for complete search history.

(56)                References Cited

U.S. PATENT DOCUMENTS

| | | | |
|---|---|---|---|
| 11,803,177 B1 * | 10/2023 | Shim ................. | G05B 23/0221 |
| 12,250,131 B2 * | 3/2025 | Kandhasamy Narayanan ........... | |
| | | | H04L 41/147 |
| 2020/0382361 A1 | 12/2020 | Chandrasekhar et al. | |
| 2021/0028973 A1 * | 1/2021 | Côté ........................ | G06N 3/09 |
| 2021/0218641 A1 * | 7/2021 | Vasseur .................. | H04L 41/16 |
| 2022/0214948 A1 | 7/2022 | Yeddu | |
| 2022/0382226 A1 * | 12/2022 | Bartling ................... | G06N 5/01 |
| 2023/0085991 A1 * | 3/2023 | Liebman ............ | G05B 23/0259 |
| | | | 700/79 |
| 2023/0093130 A1 * | 3/2023 | Fenoglio ............ | G06F 18/2433 |
| | | | 709/224 |
| 2023/0324896 A1 * | 10/2023 | Shim ................. | G05B 23/0281 |

OTHER PUBLICATIONS

Gyires-Tóth, Bálint et al., "Utilizing Deep Learning for Mobile Telecommunications Network Management," 2019 IFIP/IEE Symposium on Integrated Network and Service Management, Apr. 8, 2019, 6 pages.
Chalapathy, Raghavendra et al., "Deep Learning for Anomaly Detection: A Survey," arXiv: 1901.03407v2 [cs. LG] Jan. 23, 2019, 50 pages.

\* cited by examiner

201 For each network node, obtain procedure level time series data for each procedure performed 202 Detect anomalies at the network nodes using the procedure level time series data obtained in step 201

203 Provide a visual representation of the detected anomalies for each network node 401 Obtain procedure level time series data relating to the execution of a first procedure at the plurality of network nodes 402 Derive, from the procedure level time series data relating to the execution of the first procedure at the plurality of network nodes, one or more first feature time series of one or more respective first feature values, wherein the one or more first feature time series are for use in training a first ML model associated with the first procedure

Figure 4

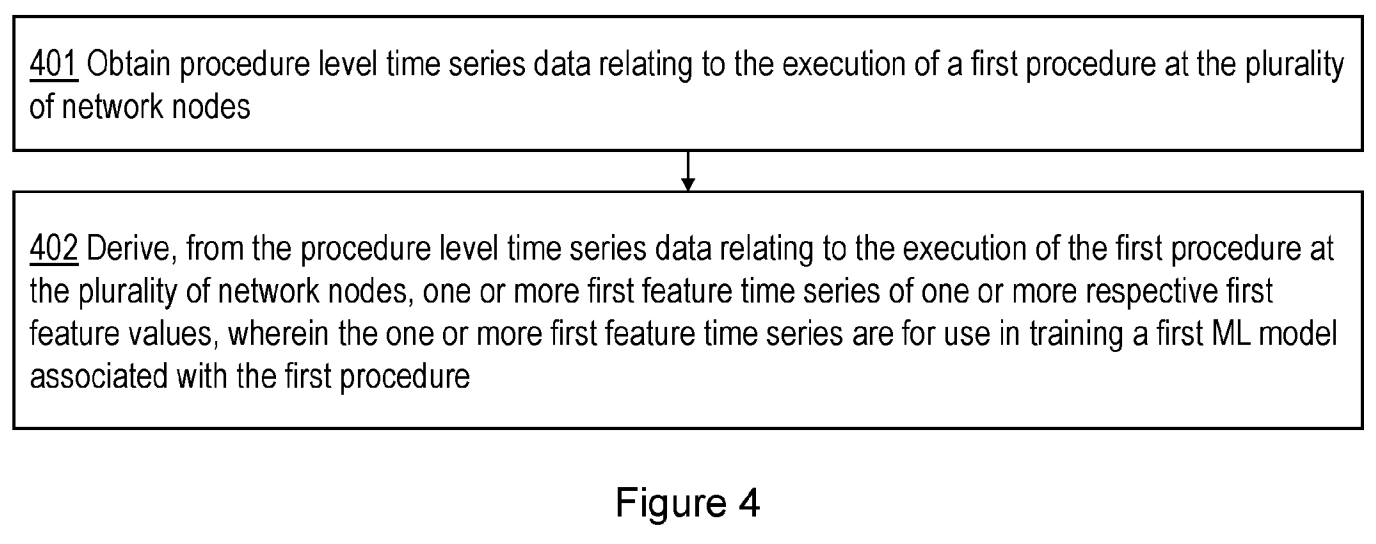

701 Obtain one or more first feature time series

702 Utilise the one or more first feature time series as training data for a first ML model 801 Obtain one or more first feature time series 802 Utilise the one or more first feature time series as input data for a first ML model

METHODS AND APPARATUSES FOR DETECTING AND LOCALIZING FAULTS USING MACHINE LEARNING MODELS

CROSS REFERENCE TO RELATED APPLICATIONS

This application is a 35 U.S.C. § 371 national stage application of PCT International Application No. PCT/EP2022/071544 filed on Aug. 1, 2022, the disclosure and content of which is incorporated by reference herein in its entirety.

TECHNICAL FIELD

Embodiments described herein relate to methods and apparatuses for pre-processing data for use in training one or more machine learning, ML, models. The one or more ML models are for use in detecting anomalies occurring during execution of one or more procedures at a plurality of network nodes in a network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Telecommunication networks are playing a critical role in today's connected society. With the development of telecom networks towards 5G and beyond, the complexity and diversity of the underlaying technologies continues to evolve rapidly. Whilst large network operators strive to provide reliable services to meet customers' expectations, the network can experience failures due to various reasons. These failures may eventually lead to partial unavailability of network services, and the occurrences of such failures may therefore cause significant revenue loss. It may therefore be considered essential to detect such anomalies as soon as possible in order to trigger troubleshooting actions. However, the network complexity and network usage patterns make it difficult to track anomalous behaviors and diagnose ambiguous failures in timely manner.

In order to automate troubleshooting processes and reduce human intervention, several solutions have been proposed that leverage Artificial Intelligence (AI) to detect and identify faults in telecom network base-stations. Many of these existing solutions rely on Key Performance Indicators (KPIs) or abnormal log traces to identify faults in telecom networks. While these solutions may help in detecting common faults in the network, they lack the ability to capture detailed information on software (SW) performance.

KPIs are designed to monitor telecom network performance degradation, and to detect anomalies in the system. However, Performance Management (PM) counters are collected and aggregated at high level for each procedure performed by a wireless device in the telecom network. Using PM counters (or KPIs) with such high granularity may not always reveal faults when only a small change has occurred (e.g., a small peak or variation in the data). Moreover, it can be difficult to detect failures that are subtle, and that therefore only produce an unnoticeable degradation in PM counters. KPIs and PM may therefore provide insufficient information to debug SW aberrant behavior and they may tolerate procedure-level failures. In other words, it is difficult to identify and locate some failures as the system lacks fine observability mechanisms.

Moreover, methods that rely on KPIs or PM counters lack the ability to capture the internal and external dependencies of procedures in their diagnosis of an anomaly. It may be considered important to capture the chain of failures (at level of procedures) in order to understand the root cause leading to system-wide problems. Debugging of the software can then be appropriately targeted.

Log files, at the other hand, are a text-based function-related history of events that describe and capture software state during its execution. They therefore provide very detailed information. However, given the limited storage budget at each network base-station, software only keeps the last sequence of events before failure, which make it computationally expensive and non-optimal to solely rely on such source of data to monitor service degradation.

Several traditional anomaly detection methods tend to use simplistic rule-based solutions based on threshold mechanisms. However, the technology behind telecom networks is evolving towards more complicated structures with rapid changes at the level of software and hardware components. Moreover, supervised ML methods are not scalable in such settings. The process of labeling faults associated with fault symptoms in a telecom network is a tedious process. The complexity of telecom systems and traffic usages makes the use of supervised ML-based detection techniques difficult due to evolving anomalous patterns. Troubleshooting complex systems, in many cases, is performed separately (e.g., considering PM counters for a specific module) which can lead to sub-optimal decisions.

On the other hand, data-based approaches rely heavily on the availability and richness of data. Multivariate time series anomaly detection has notably benefited from significant advances in neural networks. However, the availability of a large amount of training data is required to train a robust unsupervised model. Troubleshooting a new product may therefore be difficult with very small training data size. In order to avoid this problem, one can use testing labs to generate annotated data. However, while simulators and testing labs can provide an alternative solution, usually there is a difference between network node settings and behaviour in a live network as opposed to a simulated environment. Therefore, using training data from a simulated environment may present limitations.

SUMMARY

According to some embodiments there is provided a method of pre-processing data for use in training one or more machine learning, ML, models for use in detecting anomalies occurring during execution of one or more procedures at a plurality of network nodes in a network. The method comprises obtaining procedure level time series data relating to the execution of a first procedure at the plurality of network nodes; and deriving, from the procedure level time series data relating to the execution of the first procedure at the plurality of network nodes, one or more first feature time series of one or more respective first feature values, wherein the one or more first feature time series are for use in training a first ML model associated with the first procedure.

According to some embodiments there is provided a method of training one or more machine learning, ML, models for use in detecting anomalies occurring during the execution of one or more procedures at a plurality of network nodes in a network. The method comprises obtaining one or more first feature times series according to the method of pre-processing as described above; and utilising the one or more first feature time series as training data for a first ML model.

According to some embodiments there is provided a method of using one or more machine learning, ML, models for detecting anomalies occurring during the execution of one or more procedures at a plurality of network nodes in a network. The method comprises obtaining one or more first feature times series according to the method of pre-processing data as described above; and utilising the first feature time series as input values for a first ML model.

According to some embodiments there is provided a pre-processing apparatus for use in training one or more machine learning, ML, models for use in detecting anomalies occurring during execution of one or more procedures at a plurality of network nodes in a network. The pre-processing apparatus comprises processing circuitry configured to cause the pre-processing apparatus to: obtain procedure level time series data relating to the execution of a first procedure at the plurality of network nodes; and derive, from the procedure level time series data relating to the execution of the first procedure at the plurality of network nodes, one or more first feature time series of one or more respective first feature values, wherein the one or more first feature time series are for use in training a first ML model associated with the first procedure.

According to some embodiments there is provided a training apparatus for training one or more machine learning, ML, models for use in detecting anomalies occurring during the execution of one or more procedures at a plurality of network nodes in a network. The training apparatus comprises processing circuitry configured to cause the pre-processing apparatus to: obtain one or more first feature times series from a pre-processing apparatus as described above; and utilise the one or more first feature time series as training data for a first ML model.

According to some embodiments there is provided a model evaluation apparatus for using one or more machine learning, ML, models for detecting anomalies occurring during the execution of one or more procedures at a plurality of network nodes in a network. The model evaluation apparatus comprises processing circuitry configured to cause the pre-processing apparatus to: obtain one or more first feature times series from a pre-processing apparatus as described above; and utilise the first feature time series as input values for a first ML model.

According to some embodiments there is provided a computer program product comprising a computer readable medium. The computer readable medium having computer readable code embodied therein, the computer readable code being configured such that, on execution by a suitable computer or processor, the computer or processor is caused to perform a method as described above.

Aspects and examples of the present disclosure thus provide a method of pre-processing data, a method of training one or more ML models, a method of using one or more ML models, a pre-processing apparatus, a training apparatus, a model evaluation apparatus and a computer readable medium for use in detecting anomalies occurring during the execution of one or more procedures at a plurality of network nodes in a network. In particular, procedure level time series data is leveraged to provide a fine granularity of detail leading to better and more localised detection of anomalies or failures in the software running at the plurality of network nodes.

For the purposes of the present disclosure, the term "ML model" encompasses within its scope the following concepts:

Machine Learning algorithms, comprising processes or instructions through which data may be used in a training process to generate a model artefact for performing a given task, or for representing a real world process or system;

the model artefact that is created by such a training process, and which comprises the computational architecture that performs the task; and the process performed by the model artefact in order to complete the task. References to "ML model", "model", model parameters", "model information", etc., may thus be understood as relating to any one or more of the above concepts encompassed within the scope of "ML model".

BRIEF DESCRIPTION OF THE DRAWINGS

For a better understanding of the embodiments of the present disclosure, and to show how it may be put into effect, reference will now be made, by way of example only, to the accompanying drawings, in which:

FIG. 4 illustrates a method 400 of pre-processing data for use in training one or more machine learning, ML, models for use in detecting anomalies occurring during execution of one or more procedures at a plurality of network nodes in a network according to some embodiments;

DESCRIPTION

Figure 1:
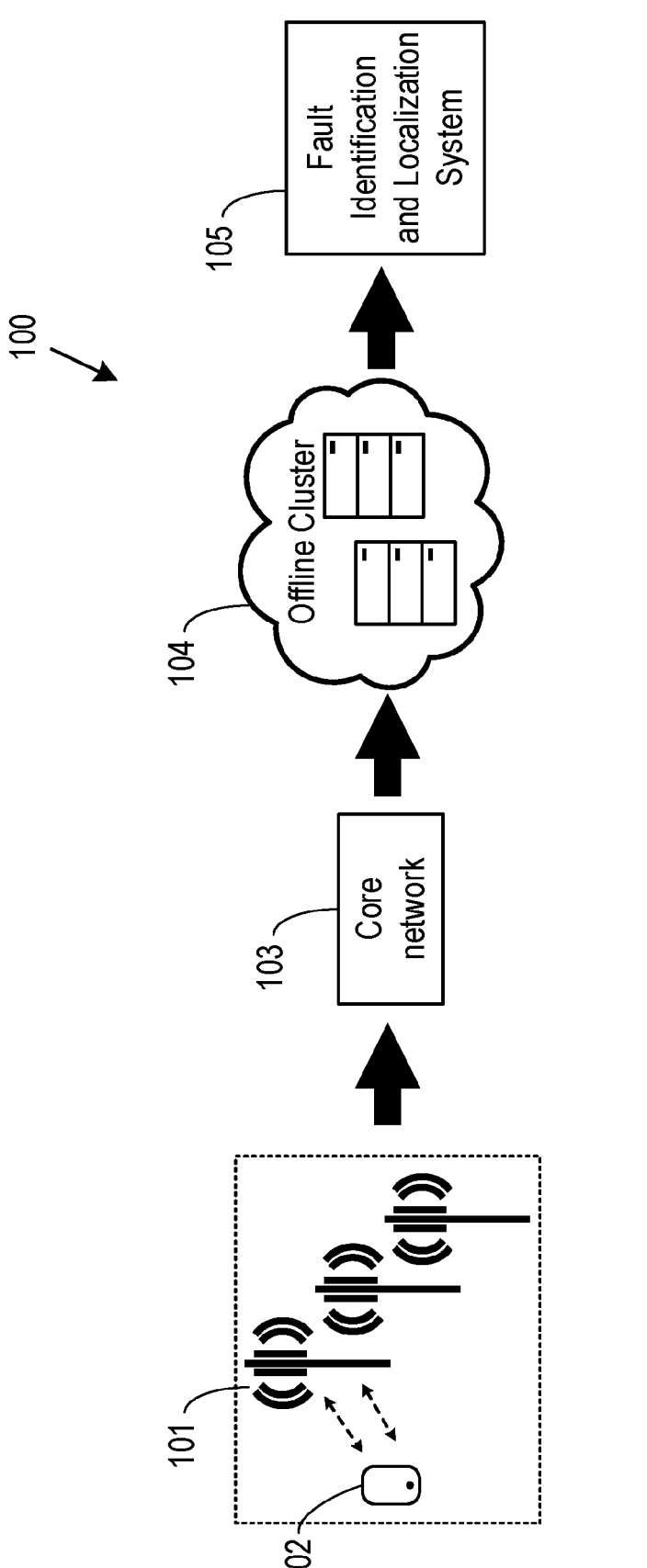
FIG. 1 is a block diagram illustrating an example of a telecom network environment 100 associated with an anomaly detection service according to some embodiments.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAS, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

In light of the limitations described above, embodiments described herein make use of a mechanism to collect internal data records on a per procedure basis. Each record records structured events associated with a particular procedure. For example, a procedure may characterize a sequence of interactions between a wireless device and a radio access network. The procedure may be standardized according to a 3GPP standard. Some embodiments described herein (e.g. those depicted in FIGS. 1 to 3) are described in the context of a wireless devices and base stations in a telecom network.

Generally, embodiments described herein may comprise one or more of the following steps:

1) Data collection and pre-processing: In the specific example of detecting faults in telecom network base stations, this step may comprise collecting network data for each of a plurality of procedures over time. The procedures capture the sequence of wireless device interactions with the base stations. The data may be collected from one or more mobile live networks on a per procedure basis.

2) Procedure data processing and preparing ML feature values: Procedures can be seen as a graph of hierarchical events. Feature values for each procedure may be extracted based on the respective graph of hierarchical events. This will be described in more detail with reference to FIGS. 4 to 6.

3) Anomaly Detection Model Training: For example, a multivariate unsupervised anomaly detection model may be used to detect system anomalies using feature values determined in step 2).

4) Fault Identification: For example, the trained model derived in step 3) may be deployed to detect anomalies in the network.

5) Visual analytics: For example, a user interface (UI) may be provided to facilitate inspecting anomalies in the network. The UI may allow for filtering of network nodes and SW used in the network.

Embodiments described herein leverage procedure-level time-series data, for example collected by Telecom SW vendors, to detect faults in a network using one or more ML models. Embodiments described herein provide a tool to detect anomalies using live network data, and in some examples provide a visual interface to annotate problems as well.

FIG. 1 is a block diagram illustrating an example of a telecom network environment 100 associated with an anomaly detection service.

The network environment 100 comprises network nodes (for example base stations, gNBs, eNBs etc. . . . ) 101. The network nodes 101 communicate with wireless devices 102 as a telecom network. The network nodes 101 are in communication with a core network 103. The core network 103 communicates data for storage in an offline cluster 104. An anomaly detection system 105 may then utilise the data collected from the network nodes 101 to perform anomaly detection.

Figure 2:
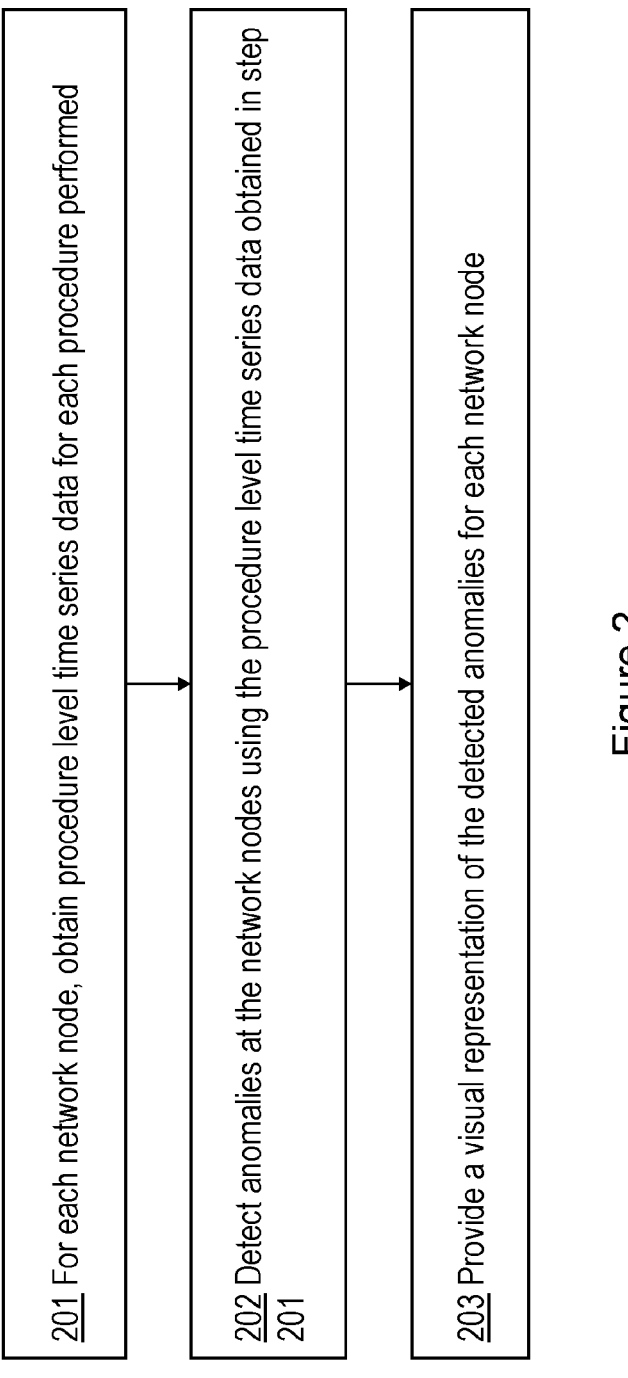
FIG. 2 illustrates an example of a method associated with a fault or anomaly detection service according to some embodiments.

FIG. 2 illustrates an example of a method associated with a fault or anomaly detection service according to some embodiments. The method of FIG. 2 may be performed by the anomaly detection system 105 of FIG. 1.

In step 201, the method comprises for each network node 101 obtaining procedure level time series data for each procedure performed.

Procedure level time-series data may provide more detailed information about a root cause of anomaly (or failure) than other observability data points for a number of reasons. Unlike PM counters, procedure level time series data may for example be defined as internal information which is not exposed to customers. This allows for the addition of more detailed information which can be used for better fault or anomaly detection and classification. The fact that it's a private data and not a part of node external interface also allows for simpler and faster deployment cycles, e.g., delivering new PM counter may take longer than delivering new event that will be a part of supervised procedure. Using procedures defined as sequence of events (for example as described in more detail with reference to FIG. 6) allows for finding connections between different procedure types that are potentially degraded due to same reason.

Table 1 illustrates an example of the difference between procedure level time-series data and PM counters for a number of procedures.

TABLE 1 shows a list of procedure examples and number of events
and counters associated with each procedure.

| Procedure name | Technology | Number of events | Number of PM counters |
|---|---|---|---|
| RRC Setup | LTE | 11 local events & 14 edges | 2 PM counters |
| S1AP Setup | LTE | 8 local events & 7 edges | 2 PM counters |
| RRC Reconfiguration | LTE | 4 local events & 3 edges | |
| Security Mode Setup | LTE | 4 local events & 3 edges | |
| UE Context Fetch | LTE | 7 local events & 6 edges | 2 PM counters |
| RRC Connection Reestablishment Request | LTE | 9 local events & 8 edges | 2 PM counters |

For example, in table 1 the procedures Security Mode Setup and RRC Reconfiguration do not result in any PM counters. PM counters cannot therefore be used to effectively troubleshoot root cause for degradation at this level. However, these procedures can be represented by a graph of hierarchical events, and the data associated with each of these events (and the edges between them) can be used to perform root cause analysis.

Moreover, data aggregation can limit the root-cause analysis capabilities. For instance, RRC Reconfiguration and Security Mode Setup can be seen as part of larger "Context Setup" procedure (from S1InitialContextSetup-Request to S1InitialContextSetupComplete) (for example, as illustrated in and described later with reference to FIG. 5). PM counters are available for Context Setup, but these PM counters don't provide any detail on what part of this procedure failed.

Furthermore, as can be seen in Table 1, for events where PM counters are available for a particular procedure, e.g. RRC Setup, there are far less PM counters associated with the procedure than events and/or edges associated with the procedure. Analysis of data associated the events and/or edges is therefore providing a far finer granularity of analysis which will better support troubleshooting of SW failures.

In step 202, the method comprises detecting anomalies at the network nodes using the procedure level time series data obtained in step 201. For example, step 201 may comprise utilising an unsupervised multivariate time series Deep Learning (DL) model to automate the process of identifying faults.

In step 203 the method may comprise providing a visual representation of the detected anomalies for each network node.

Figure 3:
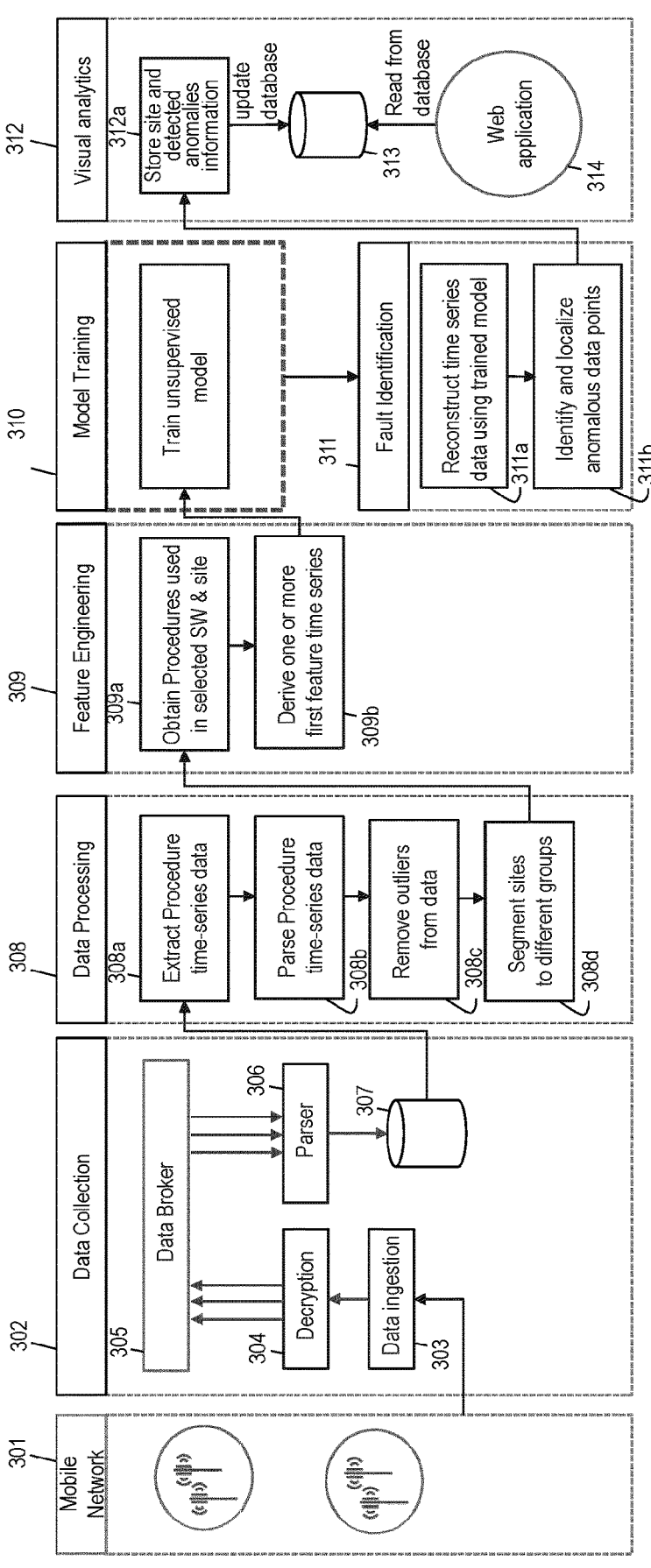
FIG. 3 illustrates a more detailed example of a network environment 300 (for example, a cloud environment) used to provide anomaly detection according to some embodiments.

FIG. 3 illustrates a more detailed example of a network environment 300 (for example, a cloud environment) used to provide anomaly detection according to some embodiments.

The network environment 300 comprises a live communication provider network 301. A data collection block 302 (for example implemented as an offline data cluster) collects procedure level time series data from the network nodes in the live customer network 301. This procedure-level time series data is ingested 303 and decrypted 304 at data collection block 302. A data broker 305 may be used to manage and scale data ingestion process. The collected data may then be parsed by a parser 306 and stored in a datalake 307. Generally, the internal network node in the live customer network 301 may have a storage budget, which prevents the software from storing large files. The data collection block 302 therefore regularly collects data from the live network 301 and stores internal logs in the datalake 307 (e.g. in an internal cloud environment).

A data processing block 308 collects the procedure level time series data from the data collection block 302 and outputs processed procedure level time series data to the feature engineering block 309. The functioning of the data processing block 308 will be described in more detail later with reference to FIG. 4.

The feature engineering block 309 derives one or more feature time series for each procedure performed at the network nodes and forwards this data to the model training block 310 for use in training one or more ML models. The functioning of the feature engineering block 309 may be described in more detail later with reference to FIGS. 4, 5 and 6. The functioning of the model training block 310 will be described in more detail later with reference to FIG. 8. As the size of the training data set (i.e., network data) is large, the use of distributed machine learning training may be seen as an effective approach to scale ML model training process.

A fault identification block 311 may then reconstruct time series data using the model (in step 311a) to identify and localize faults (in step 311b). The functioning of the model evaluation block 311 will be described in more detail later with reference to FIG. 9. A visual analytics block 312 may then store information relating to the detected anomalies in a database 313. The database 313 may also store the trained ML model together with metadata (e.g., network node information). The database 313 serves as a backend for web application 314 to visualize and present anomalies in an intuitive fashion.

FIG. 4 illustrates a method 400 of pre-processing data for use in training one or more machine learning, ML, models for use in detecting anomalies occurring during execution of one or more procedures at a plurality of network nodes in a network.

The method 400 may be performed by a logical node, which may comprise a physical or virtual node, and may be implemented in a computing device or server apparatus and/or in a virtualized environment, for example in a cloud, edge cloud or fog deployment. In some examples the method 400 is performed by the feature engineering block 309 illustrated in FIG. 3. In some examples, the method 400 is performed by the data processing block 308 together with the feature engineering block 309 illustrated in FIG. 3.

It will be appreciated that the one or more procedures may comprise procedures standardized according to a 3GPP standard. For instance, 4G-LTE SW comprises a number of LTE procedures, each providing different functionality.

In step 401, the method comprises obtaining procedure level time series data relating to the execution of a first procedure at the plurality of network nodes. In some examples step 401 is performed by the feature engineering block 309 of FIG. 3. For example, step 309a may comprise receiving the procedure level time series data from the data processing block 308. In some examples the step 401 further comprises segmenting the received procedure level time series data by procedure and, in some examples, by network node group.

Figure 5:
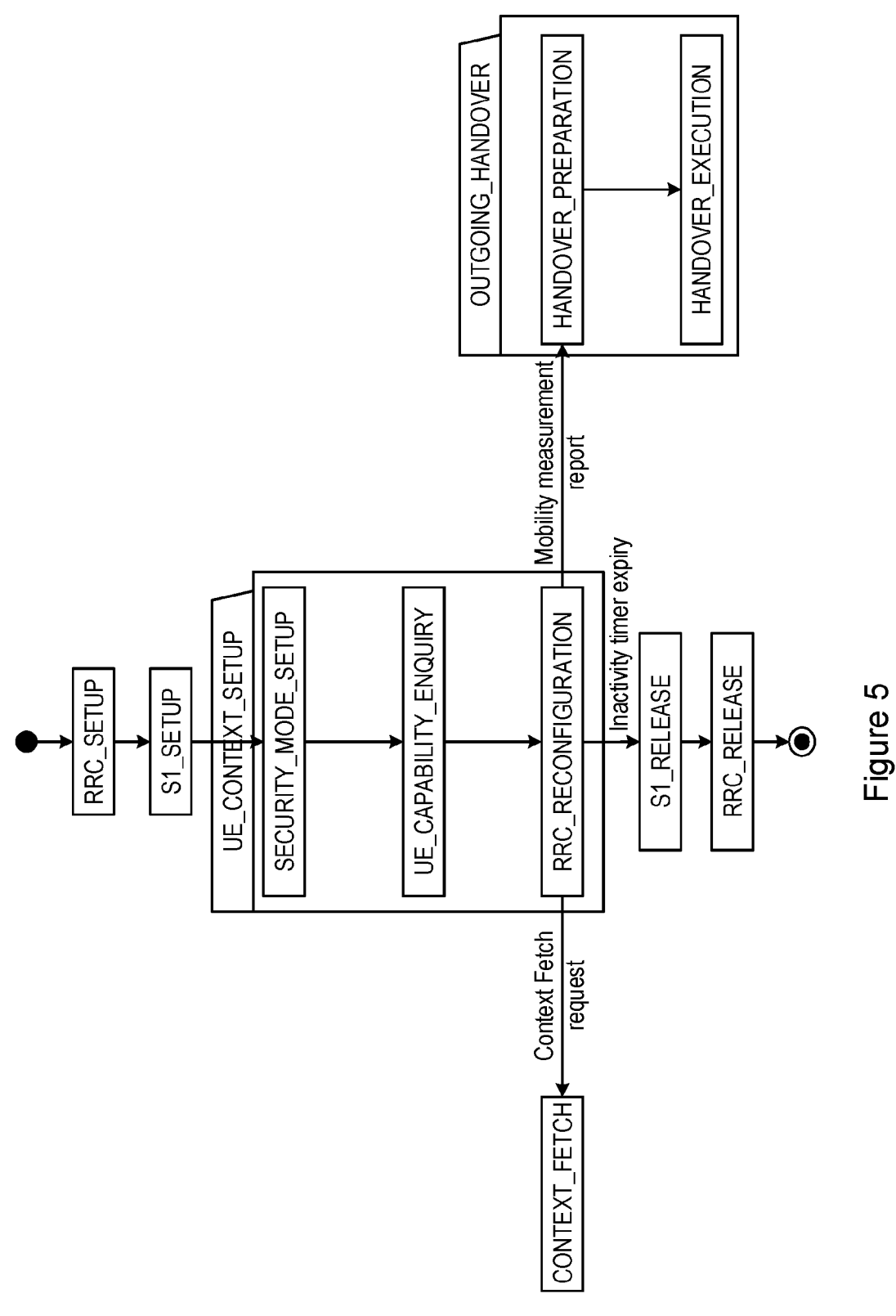
FIG. 5 is a simplified diagram illustrating some of the wireless device Radio Resource Control (RRC) and the dependencies between them.

For example, the first procedure may comprise "RRC_Setup". "RRC_Setup" is a Radio Resource Control procedure taken from TS 36.331. For example, the procedure level time series data may comprise internal log data logged at each of the plurality of network nodes when the "RRC_Setup" procedure has taken place. FIG. 5 illustrates the dependency of difference RRC procedures. It will be appreciated that not all the RRC procedures are shown and that the relations are shown in a simplified way, e.g. steps are not marked as optional etc. Other examples of RRC procedures comprise "S1_SETUP", "SECURITY_MODE_SETUP", "UE_CAPABILITY_ENQUIRY", "RRC_RECONFIG-URAITON", "CONTEXT_FETCH", "HANDOVER_PREPARATION" "HANDOVER_EXECUTION" "S1_RELEASE", and "RRC_RELEASE".

The interactions between a wireless device and a radio access network can be represented by a set of events, grouped by procedures. Once the fault is detected and located at procedure level, the sequential aspect of the procedures can be leveraged to locate faults, understand how faults propagate in the system, and understand which procedures contribute to most of problems in the network.

It will be appreciated that the method may be performed for more than one procedure. In some examples therefore the method further comprises obtaining procedure level time series data relating to the execution of a second procedure at the plurality of network nodes. It will be appreciated that procedure level time series data may be obtained for all available procedures performed at the plurality of network nodes, for example, for all procedures illustrated in FIG. 5.

For example, the data processing block 308 illustrated in FIG. 3 may obtain procedure level time series data relating to a plurality of procedures (for example from the database 307). The data processing block 308 may then extract and group data relating to different procedures (e.g. step 308a in FIG. 3). The data processing block 308 may also parse the procedure level time series data (e.g. step 308b in FIG. 3).

Often, there is an overlap between data collected on successive days. In some examples, therefore, the method may comprise pre-processing the procedure level time series data to remove duplicated events. For example, this step of pre-processing may be performed by the processing block 308 (e.g., step 308c in FIG. 3). For example, the step of pre-processing may comprise identifying and removing duplicated events by hashing the stored data. However, in some cases, data values are missing, which is often a consequence of external factors (e.g., power outage, node restarts, etc.). Time stamps with missing data may be labelled as "system unknown anomalies" and imputed values may be calculated for these timestamps.

In step 402, the method comprises deriving, from the procedure level time series data relating to the execution of the first procedure at the plurality of network nodes, one or more first feature time series of one or more respective first feature values, wherein the one or more first feature time series are for use in training a first ML model associated with the first procedure. For example, step 402 may be performed by the feature engineering block 309 in step 309b in FIG. 3. Step 402 may comprise utilising a graph of hierarchical events associated with the first procedure to determine the first feature values.

For each procedure as described by a relevant standard, a graph of hierarchical events may be constructed that represents the procedure. This graph of hierarchical events may be utilised to determine feature values associated with the procedure. By utilising a graph of hierarchical events for each procedure, the internal event dependencies within each procedure may be leveraged for anomaly localisation.

Figure 6:
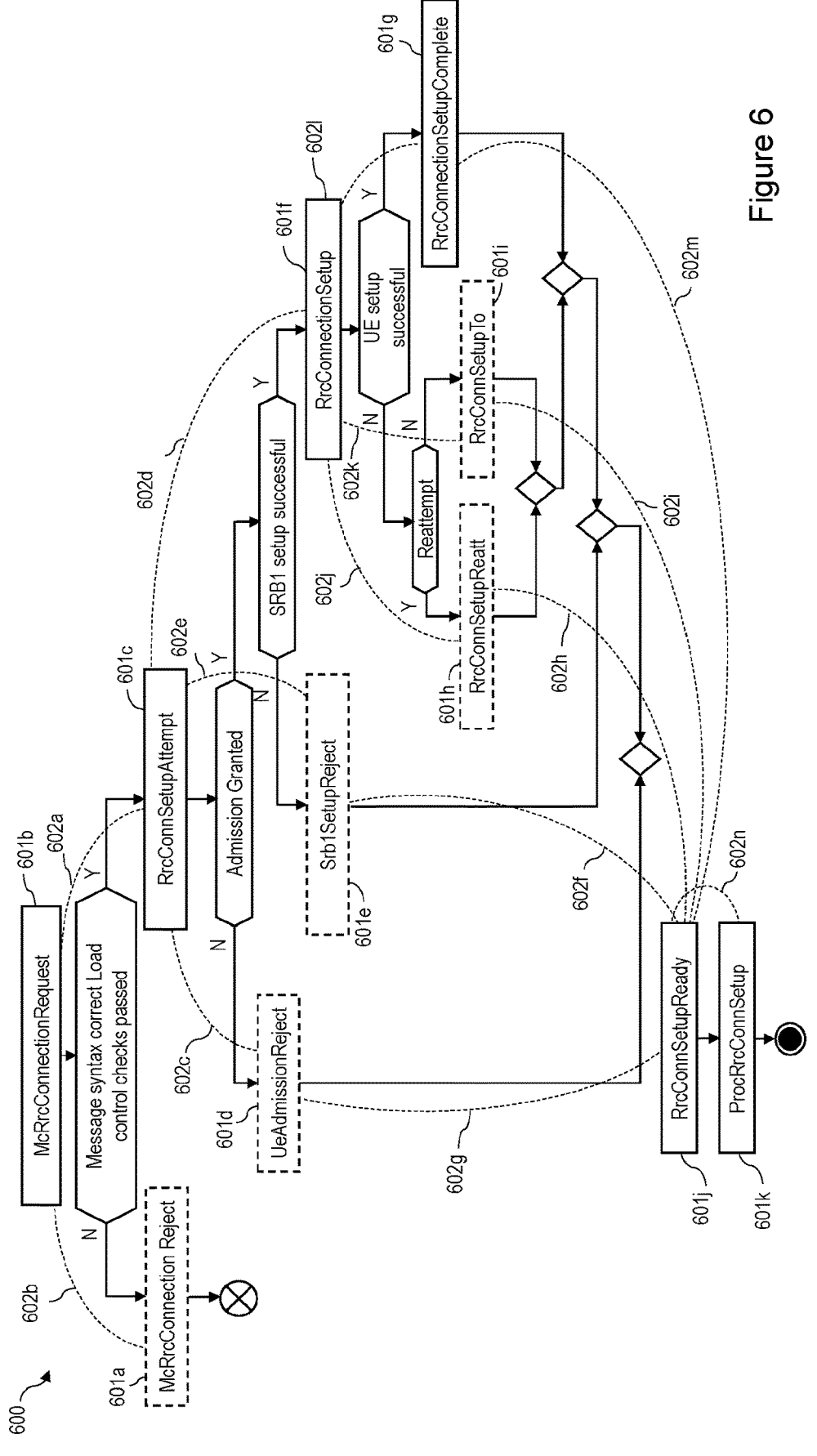
FIG. 6 illustrates an example graph of hierarchical events for a first procedure according to some embodiments.

FIG. 6 illustrates an example graph of hierarchical events for a first procedure according to some embodiments. In this example the first procedure is "RRC Setup".

From the "RRC Setup" procedure as described in the 3GPP standard, the graph 600 of hierarchical events may be constructed that represents "RRC Setup". In the graph 600 the first feature values may comprise count value increases associated with each event 601a to 601k. Each count value associated with an event may comprise a count of occurrences of that event. A sample of the count values for each event may be collected at regular time intervals (for example every 15 minutes), and the difference between the current count values and the previous count values may be taken to give the count value increases associated with each event.

For example, at time t1 the count value for event 601b may be 105. In other words, at time t1 105 wireless devices have performed the event "McRrcConnectionRequest". At time t2 the count value for event 601b may be 165. Therefore, the count value increase at time t2 is for event 601b is 60.

In some examples, step 402 comprises, for each event in a graph of hierarchical events, wherein the graph of hierarchical events represents the first procedure: determining, from the procedure level time series data relating to the execution of the first procedure at the plurality of network nodes, a time series of a count value increase for the event, wherein the count value increase comprises a difference in consecutive counts of occurrences of the event.

For the example illustrated in FIG. 6 therefore, step 402 may comprise, for each event 601a to 601k, collecting samples of the count values for the events and determining, from the samples of the count values, time series of the count sample increases associated with each event.

In some examples, the first feature values comprise edge values in the graph of hierarchical events. An edge may be defined as a connection between two events in the graph of hierarchical events. The edges in FIG. 6 are depicted with dotted arcs. An edge value for a particular edge 602a to 602n, in FIG. 6 may be determined based on the count value increases for the child event of an edge and the parent event of an edge. For example, the event 601b is a parent event and the events 601a, and 601c are the child events of 601b. The edge 602b has the parent event 601b and the child event 601a.

If for example, the event 601c has a count value of 4 at time t1 and a count value of 5 at time t2, then the count value increase for event 601c at time t2 is 1. The edge value for the edge 602a at t2 may therefore be the difference between the count value increase at t2 for 601b and the count value increase at t2 for 601c. The edge value for 602a at time t2 may therefore be 59.

The events shown within a dotted box are events associated with a failure of the RRC procedure. It will be appreciated that these events may sometimes occur when the SW running the RRC procedure is operating correctly. However, if there is an unusual spike in the count increase value associated with these events this may be indicative of an error occurring at a software level.

In some examples therefore step 402 comprises for each edge in the graph of hierarchical events, determining a time series of an edge value from a first time series of a count value for a parent event associated with the edge and a second time series of a count value for a child event associated with the edge.

Preparing the time series of the feature values in the ways described above helps to capture the flow of events in each procedure. Thereby aiding in localising anomaly detection.

In some examples, the step of deriving the one or more first feature series is based on procedure level time series data relating to the execution of the first procedure at one or more network nodes in a first network node group. For example, the method may comprise grouping the plurality of network nodes into a plurality of groups comprising the first network node group based on one or more characteristics associated with the network nodes. In some examples, the data processing block 310, as illustrated in FIG. 3, may perform the step of grouping (e.g. step 310*d* in FIG. 3).

The one or more characteristics may comprise one or more of: cell parameters associated with each network node, traffic levels at each network node, technology used at each network node (e.g., LTE, G2, NR etc.) and software version. Grouping the network nodes that have the same characteristics allows for analysis of a homogenous group of network nodes. The grouping of network nodes may be performed based on a set of rules.

Figure 7:
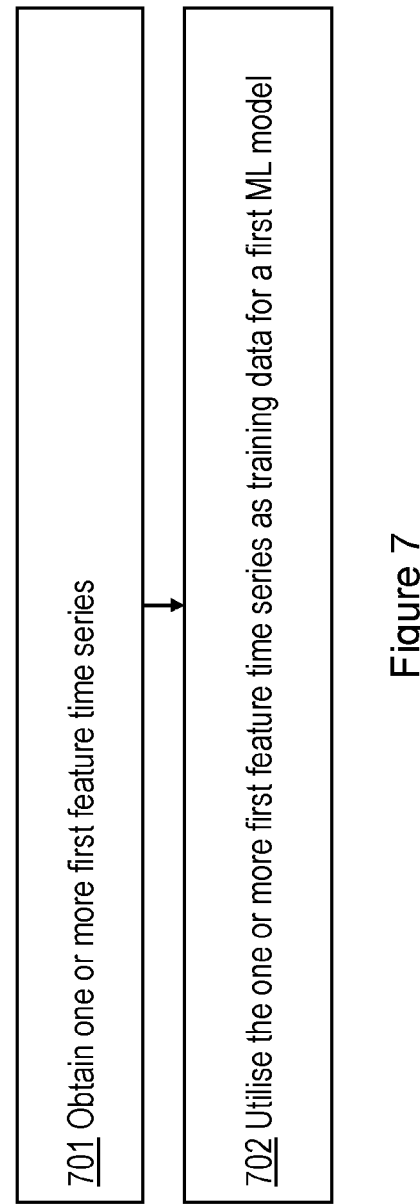
FIG. 7 illustrates a method 700 of training one or more machine learning, ML, models for use in detecting anomalies occurring during the execution of one or more procedures at a plurality of network nodes in a network.

FIG. 7 illustrates a method 700 of training one or more machine learning, ML, models for use in detecting anomalies occurring during the execution of one or more procedures at a plurality of network nodes in a network.

The method 700 may be performed by a logical node, which may comprise a physical or virtual node, and may be implemented in a computing device or server apparatus and/or in a virtualized environment, for example in a cloud, edge cloud or fog deployment. In some examples the method 700 is performed by the model training block 310 illustrated in FIG. 3.

In step 701 the method comprises obtaining one or more first feature time series. The first feature time series may be obtained as described above with reference to FIGS. 4 to 6.

In step 702, the method comprises utilising the one or more first feature time series as training data for a first ML model.

It will be appreciated that the method may further comprise obtaining one or more second feature times series; and utilising the one or more second feature time series as training data for a second ML model.

The idea is for the trained one or more ML models to track procedures that fail to complete their tasks when an anomaly occurs. By comparing the patterns in the first feature time series containing procedures that both fail and succeed, the one or more ML models can identify where the failure is occurring.

For example, considering the graph of hierarchical events illustrated in FIG. 6, an unexpected failure may occur that results in the count value increases associated with events 601*d* and 601*e* to unexpectedly follow a different pattern. Based on this, it may be asserted that there is likely a problem with the software associated with the RrcConn-SetupAttempt stage in the process, as this could be causing both of these events to exhibit a change in pattern. Conversely, if only the event 601*e* is exhibiting a different pattern than it normally does (and not 601*d*), then it may be more likely that the software problem is associated with the SRB1 setup being successful. In this way, the debugging of the software can be guided by the localization of the anomalies found.

In some examples the first ML model comprises a Long Short-Term Memory (LSTM) autoencoder model. It will be appreciated that each of the one or more ML models may comprise an LSTM autoencoder model. However, different models may be used, and different types of model may be used for different procedures. The first ML model may comprise any unsupervised multivariate time series anomaly detection model. By using unsupervised ML models, the use of class labels can be avoided. This is particularly useful when the data sets are so large.

The first ML model may utilise a stacked LSTM architecture to learn representation of the time series of the first feature values as a fixed-length vector. This vector is then used later as an input to the decoder part of the first ML model. The LSTM autoencoder may be fine-tuned during a training phase to minimize the reconstruction error (for example using an Adam Optimiser) between the reconstructed time series of the first feature values and the original time series of the first feature values.

Figure 8:
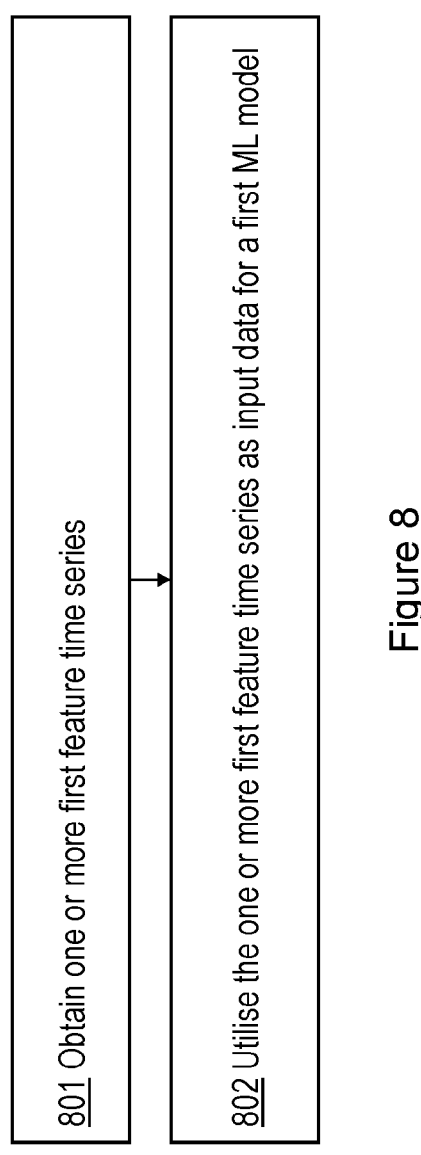
FIG. 8 illustrates a method 800 of using one or more machine learning, ML, models for detecting anomalies occurring during the execution of one or more procedures at a plurality of network nodes in a network.

FIG. 8 illustrates a method 800 of using one or more machine learning, ML, models for detecting anomalies occurring during the execution of one or more procedures at a plurality of network nodes in a network.

The method 800 may be performed by a logical node, which may comprise a physical or virtual node, and may be implemented in a computing device or server apparatus and/or in a virtualized environment, for example in a cloud, edge cloud or fog deployment. In some examples the method 800 is performed by the model evaluation block 311 illustrated in FIG. 3.

In step 801 the method comprises obtaining one or more first feature times series. The one or more first feature time series may be obtained as described with reference to FIGS. 4 to 6.

In step 802 the method comprises utilising the one or more first feature time series as input data for a first ML model. The first ML model may be trained as described with reference to FIG. 8.

In the LSTM autoencoder algorithm, points with an abnormal reconstruction error (e.g. larger than a specified anomaly threshold) may be flagged as anomalies. The choice of anomaly threshold has an impact on the number of points classified as anomalous. Ideally, an anomaly threshold may be defined to identify all anomalies while minimizing false detections. Alternatively, or additionally, data points that do not follow a normal pattern may be flagged as anomalies.

The task of identifying anomalies may be performed periodically by the first ML model. The data points flagged as anomalous may be stored in a local database. For example, the visual analytics block 312 may in step 312*a* store the data points flagged as anomalous in the database 313. The stored data may then be visualized through web interface.

Figure 9:
FIG. 9 illustrates the results of analysis conducted to compare an ML model trained on PM counters and an ML model trained on procedure-level time series data.

Embodiments described herein have already been developed, and the model has been trained, and tested internally on live field data of several mobile operators. The results of the experiments were positive. Analysis was conducted to compare an ML model trained on PM counters and an ML model trained on procedure-level time series data. FIG. 9 illustrates the results of the comparison. Given the nature of an unsupervised model, the results were inspected manually with help of domain experts.

The ML model trained using procedure-level time series data was able to detect all common failures (e.g. 901, 902 and 903) that were detected using the ML model trained using PM counters. This is intuitive, as PM counters are aggregated information of a set of procedure events. However, the ML model training using procedure level time-series data was, in some cases, able to detect anomalies that were not detected by the ML model trained using PM counters (e.g. 904). Moreover, the ML model trained using procedure level time series data may be able to locate problems faster, which reduces time spent to troubleshoot SW. The method can help in finding connections between different procedure types that are potentially degraded, which can enable Telecom SW vendors to enhance SW quality accordingly.

Figure 10:
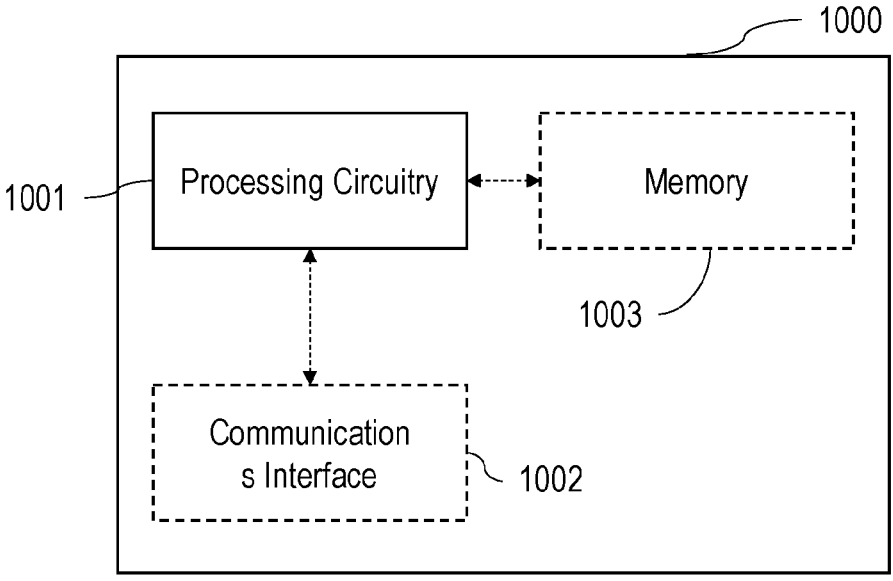
FIG. 10 illustrates a pre-processing apparatus comprising processing circuitry (or logic)

FIG. 10 illustrates a pre-processing apparatus 1000 comprising processing circuitry (or logic) 1001. The processing circuitry 1001 controls the operation of the pre-processing apparatus 1000 and can implement the method described herein in relation to a data processing block 308 and/or a feature engineering block 309. The processing circuitry 1001 can comprise one or more processors, processing units, multi-core processors or modules that are configured or programmed to control the pre-processing apparatus 1000 in the manner described herein. In particular implementations, the processing circuitry 1001 can comprise a plurality of software and/or hardware modules that are each configured to perform, or are for performing, individual or multiple steps of the method described herein in relation to a data processing block 308 and/or a feature engineering block 309.

Briefly, the processing circuitry 1001 of the pre-processing apparatus 1000 is configured to: obtain procedure level time series data relating to the execution of a first procedure at the plurality of network nodes; and derive, from the procedure level time series data relating to the execution of the first procedure at the plurality of network nodes, one or more first feature time series of one or more respective first feature values, wherein the one or more first feature time series are for use in training a first ML model associated with the first procedure.

In some embodiments, the pre-processing apparatus 1000 may optionally comprise a communications interface 1002. The communications interface 1002 of the pre-processing apparatus 1000 can be for use in communicating with other nodes, such as other virtual nodes. For example, the communications interface 1002 of the pre-processing apparatus 1000 can be configured to transmit to and/or receive from other nodes requests, resources, information, data, signals, or similar. The processing circuitry 1001 of pre-processing apparatus 1000 may be configured to control the communications interface 1002 of the pre-processing apparatus 1000 to transmit to and/or receive from other nodes requests, resources, information, data, signals, or similar.

Optionally, the pre-processing apparatus 1000 may comprise a memory 1003. In some embodiments, the memory 1003 of the pre-processing apparatus 1000 can be configured to store program code that can be executed by the processing circuitry 1001 of the pre-processing apparatus 1000 to perform the method described herein in relation to the pre-processing apparatus 1000. Alternatively or in addition, the memory 1003 of the pre-processing apparatus 1000, can be configured to store any requests, resources, information, data, signals, or similar that are described herein. The processing circuitry 1001 of the pre-processing apparatus 1000 may be configured to control the memory 1003 of the pre-processing apparatus 1000 to store any requests, resources, information, data, signals, or similar that are described herein.

Figure 11:
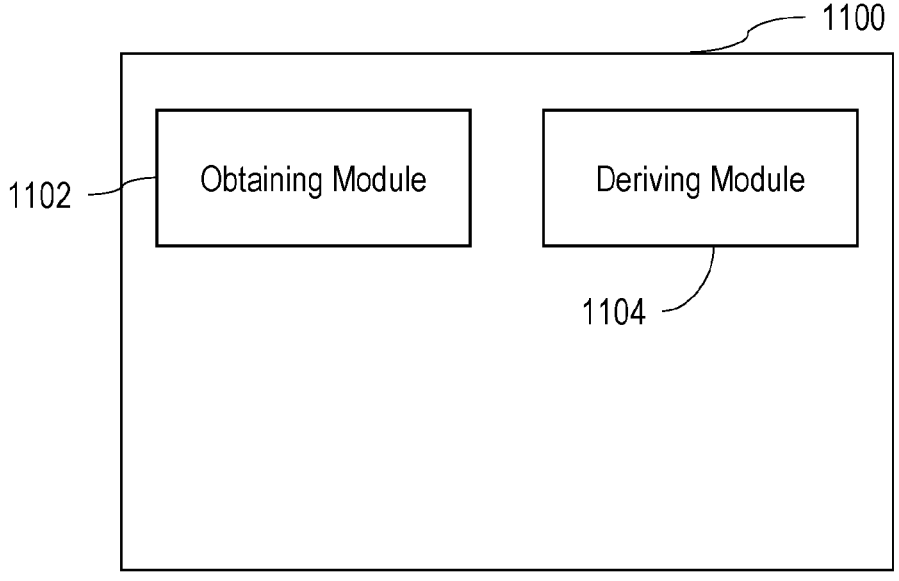
FIG. 11 is a block diagram illustrating a pre-processing apparatus according to some embodiments.

FIG. 11 is a block diagram illustrating a pre-processing apparatus 1100 in accordance with an embodiment. The pre-processing apparatus 1100 may be configured to produce feature time series as described above. The pre-processing apparatus 1100 comprises an obtaining module 1102 configured to obtain procedure level time series data relating to the execution of a first procedure at the plurality of network nodes. The pre-processing apparatus 1100 comprises a deriving module 1104 configured to derive, from the procedure level time series data relating to the execution of the first procedure at the plurality of network nodes, one or more first feature time series of one or more respective first feature values, wherein the one or more first feature time series are for use in training a first ML model associated with the first procedure. The apparatus 1100 may operate in the manner described herein in respect of a data processing block 308 and/or a feature engineering block 309.

Figure 12:
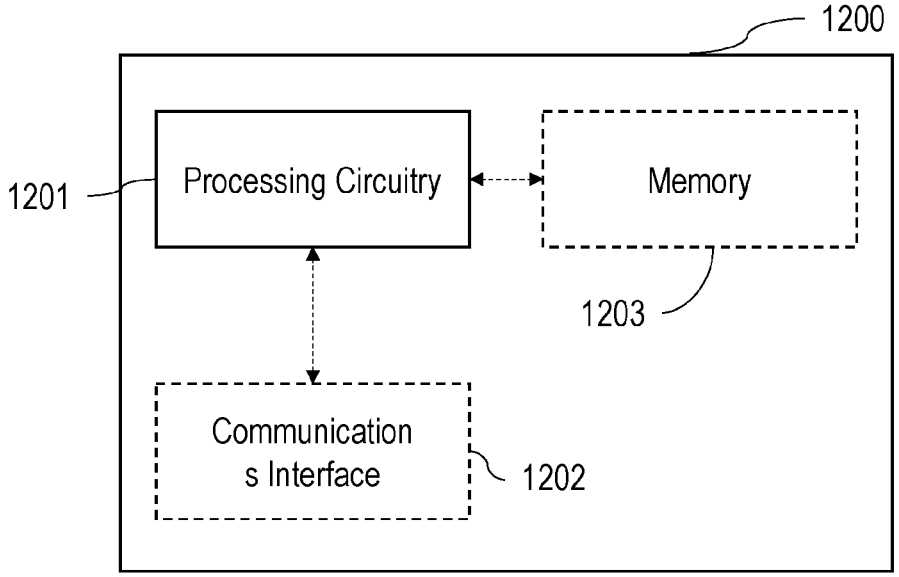
FIG. 12 illustrates training apparatus comprising processing circuitry (or logic) according to some embodiments.

FIG. 12 illustrates training apparatus 1200 comprising processing circuitry (or logic) 1201. The processing circuitry 1201 controls the operation of the training apparatus 1200 and can implement the method described herein in relation to a training apparatus 1200. The processing circuitry 1201 can comprise one or more processors, processing units, multi-core processors or modules that are configured or programmed to control the training apparatus 1200 in the manner described herein. In particular implementations, the processing circuitry 1201 can comprise a plurality of software and/or hardware modules that are each configured to perform, or are for performing, individual or multiple steps of the method described herein in relation to the training apparatus 1200.

Briefly, the processing circuitry 1201 of the training apparatus 1200 is configured to: obtain one or more first feature times series from a pre-processing apparatus 1200 as described above; and utilise the one or more first feature time series as training data for a first ML model.

In some embodiments, the training apparatus 1200 may optionally comprise a communications interface 1202. The communications interface 1202 of the training apparatus 1200 can be for use in communicating with other nodes, such as other virtual nodes. For example, the communications interface 1202 of the training apparatus 1200 can be configured to transmit to and/or receive from other nodes requests, resources, information, data, signals, or similar. The processing circuitry 1201 of training apparatus 1200 may be configured to control the communications interface 1202 of the training apparatus 1200 to transmit to and/or receive from other nodes requests, resources, information, data, signals, or similar.

Optionally, the training apparatus 1200 may comprise a memory 1203. In some embodiments, the memory 1203 of the training apparatus 1200 can be configured to store program code that can be executed by the processing circuitry 1201 of the training apparatus 1200 to perform the method described herein in relation to the training apparatus 1200. Alternatively or in addition, the memory 1203 of the training apparatus 1200, can be configured to store any requests, resources, information, data, signals, or similar that are described herein. The processing circuitry 1201 of the training apparatus 1200 may be configured to control the memory 1203 of the training apparatus 1200 to store any requests, resources, information, data, signals, or similar that are described herein.

Figure 13:
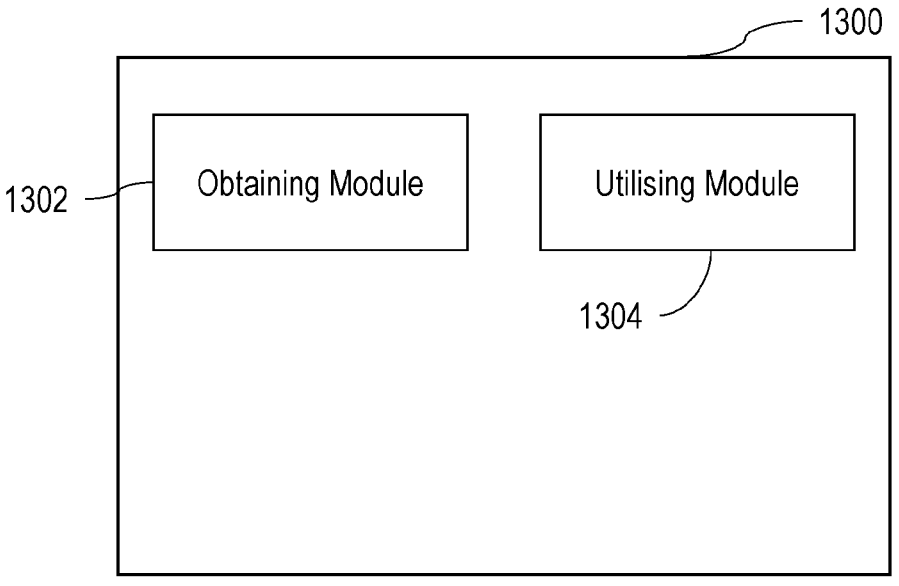
FIG. 13 is a block diagram illustrating an training apparatus 1300 according to some embodiments.

FIG. 13 is a block diagram illustrating an training apparatus 1300 in accordance with an embodiment. The training apparatus 1300 can train one or more ML models. The training apparatus 1300 comprises an obtaining module 1302 configured to obtain one or more first feature times series from a pre-processing apparatus as described above. The apparatus 1300 comprises a utilising module 1304 configured to utilise the one or more first feature time series as training data for a first ML model. The apparatus 1300 may operate in the manner described herein in respect of an training apparatus or a model training block 310.

Figure 14:
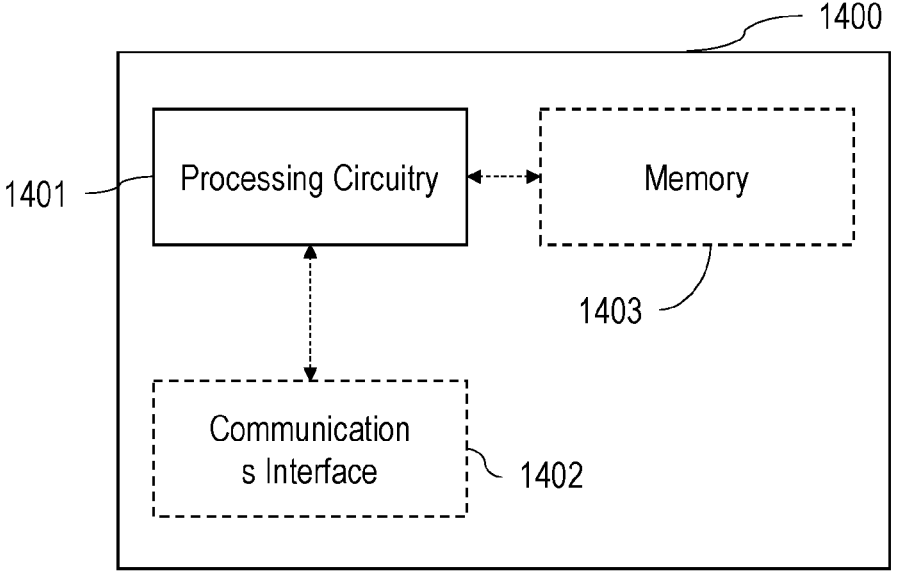
FIG. 14 illustrates a model evaluation apparatus comprising processing circuitry (or logic) according to some embodiments.

FIG. 14 illustrates a model evaluation apparatus 1400 comprising processing circuitry (or logic) 1401. The processing circuitry 1401 controls the operation of the model evaluation apparatus 1400 and can implement the method described herein in relation to a model evaluation apparatus 1400 or a model evaluation block 311. The processing circuitry 1401 can comprise one or more processors, processing units, multi-core processors or modules that are configured or programmed to control the model evaluation apparatus 1400 in the manner described herein. In particular implementations, the processing circuitry 1401 can comprise a plurality of software and/or hardware modules that are each configured to perform, or are for performing, individual or multiple steps of the method described herein in relation to the model evaluation apparatus 1400.

Briefly, the processing circuitry 1401 of the model evaluation apparatus 1400 is configured to: obtain one or more first feature times series utilising a pre-processing apparatus as described above; and utilise the first feature time series as input values for a first ML model.

In some embodiments, the model evaluation apparatus 1400 may optionally comprise a communications interface 1402. The communications interface 1402 of the model evaluation apparatus 1400 can be for use in communicating with other nodes, such as other virtual nodes. For example, the communications interface 1402 of the model evaluation apparatus 1400 can be configured to transmit to and/or receive from other nodes requests, resources, information, data, signals, or similar. The processing circuitry 1401 of model evaluation apparatus 1400 may be configured to control the communications interface 1402 of the model evaluation apparatus 1400 to transmit to and/or receive from other nodes requests, resources, information, data, signals, or similar.

Optionally, the model evaluation apparatus 1400 may comprise a memory 1403. In some embodiments, the memory 1403 of the model evaluation apparatus 1400 can be configured to store program code that can be executed by the processing circuitry 1401 of the model evaluation apparatus 1400 to perform the method described herein in relation to the model evaluation apparatus 1400. Alternatively or in addition, the memory 1403 of the model evaluation apparatus 1400, can be configured to store any requests, resources, information, data, signals, or similar that are described herein. The processing circuitry 1401 of the model evaluation apparatus 1400 may be configured to control the memory 1403 of the model evaluation apparatus 1400 to store any requests, resources, information, data, signals, or similar that are described herein.

Figure 15:
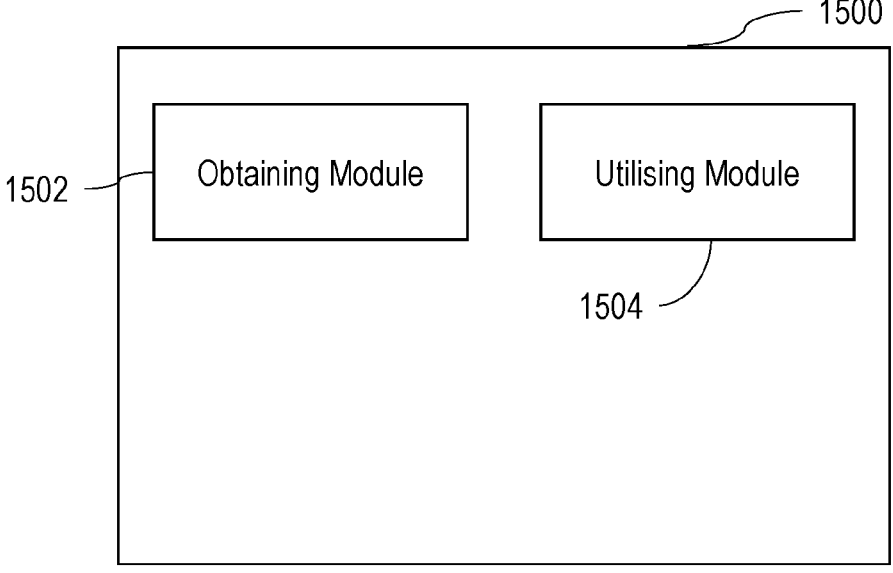
FIG. 15 is a block diagram illustrating a model evaluation apparatus according to some embodiments.

FIG. 15 is a block diagram illustrating a model evaluation apparatus 1500 in accordance with an embodiment. The model evaluation apparatus 1500 can utilise one or more ML models to detect anomalies. The model evaluation apparatus 1500 comprises an obtaining module 1502 configured to obtain one or more first feature times series from a pre-processing apparatus as described above. The apparatus 1500 comprises a utilising module 1504 configured to utilise the first feature time series as input values for a first ML model. The apparatus 1500 may operate in the manner described herein in respect of a model evaluation apparatus 1500 or a module evaluation block 311.

There is also provided a computer program comprising instructions which, when executed by processing circuitry (such as the processing circuitry 1001 of the pre-processing apparatus 1000 described earlier, cause the processing circuitry to perform at least part of the method described herein. There is provided a computer program product, embodied on a non-transitory machine-readable medium, comprising instructions which are executable by processing circuitry to cause the processing circuitry to perform at least part of the method described herein. There is provided a computer program product comprising a carrier containing instructions for causing processing circuitry to perform at least part of the method described herein. In some embodiments, the carrier can be any one of an electronic signal, an optical signal, an electromagnetic signal, an electrical signal, a radio signal, a microwave signal, or a computer-readable storage medium.

Embodiments described herein may provide the following advantages:

By leveraging procedure level time-series data collected by Telecom SW vendors to detect faults in telecom network base-stations, embodiments may enable telecom companies to find SW problems easier and faster as this is detailed data rather than generic base station failure traces, or base station counters.

Minimizing the efforts to find anomalies leads to high network reliability and availability.

Embodiments described herein may be applied for any region, or operator network. They do not rely heavily on local knowledge, which make the embodiments easy to scale.

The embodiments described herein may alleviate expenses for tasks that are often handled by customer support as well as troubleshooting activities by network engineers.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A computer implemented method of pre-processing data implemented using a processing circuitry for use in training one or more machine learning, ML, models for use in detecting anomalies occurring during execution of one or more procedures at a plurality of network nodes in a network, the method comprising:

obtaining procedure level time series data relating to the execution of a first procedure at the plurality of network nodes;

deriving, from the procedure level time series data relating to the execution of the first procedure at the plurality of network nodes, one or more first feature time series of one or more respective first feature values, wherein the one or more first feature time series are for use in training a first ML model associated with the first procedure; and the one or more first feature time series comprises at least one time series of a count value increase, and wherein the step of deriving one or more first feature time series comprises:

for each event in a graph of hierarchical events, wherein the graph of hierarchical events represents the first procedure:

determining, from the procedure level time series data relating to the execution of the first procedure at the plurality of network nodes, a time series of a count value increase for the event, wherein the count value increase comprises a difference in consecutive counts of occurrences of the event.

2. The method as claimed in claim 1 further comprising:

obtaining procedure level time series data relating to the execution of a second procedure at the plurality of network nodes; and deriving, from the procedure level time series data relating to the execution of a second procedure at the plurality of network nodes, one or more second feature time series of one or more respective second feature values, wherein the one or more second feature time series are for use in training a second ML model associated with the second procedure.

3. The method as claimed in claim 1 wherein the one or more first feature times series comprises at least one time series of an edge value, and wherein the step of deriving the one or more first feature time series further comprises:

for each edge in the graph of hierarchical events, determining a time series of an edge value from a first time series of a count value for a parent event associated with the edge;

and a second time series of a count value for a child event associated with the edge.

4. The method as claimed in claim 1 wherein the step of deriving the one or more first feature series is based on procedure level time series data relating to the execution of the first procedure at one or more network nodes in a first network node group.

5. The method as claimed in claim 4 further comprising grouping the plurality of network nodes into a plurality of groups comprising the first network node group based on one or more characteristics associated with the network nodes.

6. The method as claimed in claim 5 wherein the one or more characteristics comprises one or more of: cell parameters associated with each network node, traffic levels at each network node, technology used at each network node and software version.

7. The method as claimed in claim 1 wherein the procedure level time series data comprises internal log data logged at each of the plurality of network nodes.

8. The method as claimed in claim 1 wherein the one or more procedures comprise procedures standardized according to a 3GPP standard.

9. The method as claimed in claim 1 further comprising pre-processing the procedure level time series data to remove duplicated events.

10. The method as claimed in claim 1, further comprising performing the training of the one or more ML models including by utilising the one or more first feature time series as training data for a first ML model.

11. The method as claimed in claim 10 further comprising:

obtaining procedure level time series data relating to the execution of a second procedure at the plurality of network nodes;

deriving, from the procedure level time series data relating to the execution of a second procedure at the plurality of network nodes, one or more second feature time series of one or more respective second feature values, wherein the one or more second feature time series are for use in training a second ML model associated with the second procedure; and utilising the one or more second feature time series as training data for a second ML model.

12. The method as claimed in claim 1 wherein the first ML model comprises a Long Short-Term Memory (LSTM) autoencoder model.

13. The method as claimed in claim 12 wherein the first ML model is trained using Encoder-Decoder LSTM architecture.

14. The method as claimed in claim 1, further comprising using the one or more ML models for detecting anomalies occurring during execution of one or more procedures at the plurality of network nodes in the network, including by utilising the first feature time series as input values for a first ML model.

15. An apparatus for use in training one or more machine learning, ML, models for use in detecting anomalies occurring during execution of one or more procedures at a plurality of network nodes in a network, the apparatus comprising processing circuitry configured to cause the apparatus to:

obtain procedure level time series data relating to the execution of a first procedure at the plurality of network nodes;

derive, from the procedure level time series data relating to the execution of the first procedure at the plurality of network nodes, one or more first feature time series of one or more respective first feature values, wherein the one or more first feature time series are for use in training a first ML model associated with the first procedure; and the one or more first feature time series comprises at least one time series of a count value increase, and wherein the step of deriving one or more first feature time series comprises:

for each event in a graph of hierarchical events, wherein the graph of hierarchical events represents the first procedure:

determining, from the procedure level time series data relating to the execution of the first procedure at the plurality of network nodes, a time series of a count value increase for the event, wherein the count value increase comprises a difference in consecutive counts of occurrences of the event.

16. The apparatus as claimed in claim 15 wherein the processing circuitry is further operative to:

obtain procedure level time series data relating to the execution of a second procedure at the plurality of network nodes; and derive, from the procedure level time series data relating to the execution of a second procedure at the plurality of network nodes, one or more second feature time series of one or more respective second feature values, wherein the one or more second feature time series are for use in training a second ML model associated with the second procedure.

17. The apparatus as claimed in claim 15, wherein the processing circuitry is further operative for training the one or more machine learning, ML, models for use in detecting anomalies occurring during the execution of one or more procedures at the plurality of network nodes in the network, and is further operative to:

obtain one or more first feature times series from a pre-processing apparatus as claimed in claim 15; and utilise the one or more first feature time series as training data for a first ML model.

* * * * *